(12) United States Patent
Takeyama et al.

(10) Patent No.: US 11,217,813 B2
(45) Date of Patent: Jan. 4, 2022

(54) FUEL CELL, FUEL CELL MOUNTED DEVICE, AND METHOD OF MANUFACTURING FUEL CELL

(71) Applicant: TOYOTA JIDOSHA KABUSHIKI KAISHA, Toyota (JP)

(72) Inventors: Makoto Takeyama, Toyota (JP); Shigehito Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 16/657,962

(22) Filed: Oct. 18, 2019

(65) Prior Publication Data

US 2020/0144655 A1   May 7, 2020

(30) Foreign Application Priority Data

Nov. 7, 2018   (JP) .............................. JP2018-209463

(51) Int. Cl.

| | |
|---|---|
| *H01M 8/2483* | (2016.01) |
| *H01M 8/0265* | (2016.01) |
| *H01M 8/0256* | (2016.01) |
| *H01M 8/04089* | (2016.01) |
| *H01M 8/24* | (2016.01) |
| *H01M 8/04119* | (2016.01) |

(52) U.S. Cl.
CPC ....... *H01M 8/2483* (2016.02); *H01M 8/0256* (2013.01); *H01M 8/0265* (2013.01); *H01M 8/04089* (2013.01); *H01M 8/24* (2013.01); H01M 8/04156 (2013.01)

(58) Field of Classification Search
CPC .. H01M 8/0265; H01M 8/04089; H01M 8/24; H01M 8/2483
USPC ......................................................... 429/434
See application file for complete search history.

(56) References Cited

U.S. PATENT DOCUMENTS

| | | | | |
|---|---|---|---|---|
| 2015/0288020 | A1* | 10/2015 | Yamamoto | H01M 8/04007 429/460 |
| 2016/0111748 | A1* | 4/2016 | Yamaura | H01M 8/2465 429/457 |
| 2016/0344058 | A1* | 11/2016 | Naito | B60L 58/33 |
| 2017/0237107 | A1* | 8/2017 | Naito | H01M 8/248 429/469 |
| 2017/0263969 | A1* | 9/2017 | Nara | H01M 8/04007 |

(Continued)

FOREIGN PATENT DOCUMENTS

| | | |
|---|---|---|
| JP | 2009-158338 A | 7/2009 |
| JP | 2016-061395 A | 4/2019 |

*Primary Examiner* — James M Erwin
(74) *Attorney, Agent, or Firm* — Dickinson Wright, PLLC

(57) ABSTRACT

A fuel cell includes a fuel cell stack having a stacked body with a plurality of stacked unit cells, an end plate unit, and a gas manifold penetrating the stacked body and the end plate unit in a stacking direction for a flow of reaction gas. The fuel cell also includes a valve that is provided between the end plate unit and gas piping and includes an in-valve flow path for communicating the gas manifold and the gas piping and a valve element. The gas manifold includes a stacked body manifold and an end plate unit flow path. When the fuel cell stack is arranged so that a manifold bottom portion is horizontal, a bottom portion of an opening on the valve side in the end plate unit flow path is arranged above the manifold bottom portion.

10 Claims, 11 Drawing Sheets

(56) References Cited

U.S. PATENT DOCUMENTS

2018/0166705 A1\* 6/2018 Ko .................... H01M 8/2483
2018/0309151 A1\* 10/2018 Yamaura ............. H01M 8/2484

\* cited by examiner

FUEL CELL, FUEL CELL MOUNTED DEVICE, AND METHOD OF MANUFACTURING FUEL CELL

CROSS-REFERENCE TO RELATED APPLICATION

This application claims priority to Japanese Patent Application No. 2018-209463, filed Nov. 7, 2018, the disclosure of which is incorporated by reference herein in its entirety.

BACKGROUND

Field

The present disclosure relates to a fuel cell, a fuel cell device, and a method of manufacturing the fuel cell device.

Related Art

In a fuel cell, produced water normally occurs with power generation. To improve water draining characteristics for discharging liquid water such as produced water from a fuel cell, there is conventionally proposed a configuration in which a gas discharge manifold, which is formed in a stacked body with stacked fuel battery cells, is formed to tilt downward, and a gas discharge flow path, which is formed in an end plate arranged at an end of the stacked body, is formed to tilt downward with a larger inclination angle (See Patent Literature 1, for example).

Patent Literature 1: JP 2009-158338A

However, the inventors of the disclosure found a new problem that even when the above-described shape is adapted for the gas discharge flow path, if a valve is provided adjacent to a fuel cell, liquid water may enter the valve after the fuel cell stops power generation, which causes freezing of liquid water in the valve.

SUMMARY

One aspect of the disclosure provides a fuel cell. The fuel cell includes a fuel cell stack including a stacked body with a plurality of stacked unit cells, an end plate unit with an end plate arranged at an end of the stacked body, and a gas manifold penetrating the stacked body and the end plate unit in a stacking direction, the gas manifold being configured such that reaction gas flows through therein; and a valve disposed between the end plate unit and a gas piping configured to supply or discharge the reaction gas to or from the fuel cell, and the valve including an in-valve flow path communicating the gas manifold and the gas piping, and a valve element. The gas manifold includes a stacked body manifold penetrating the stacked body in the stacking direction and an end plate unit flow path penetrating the end plate unit, and when the fuel cell stack is arranged so that a manifold bottom portion that is a bottom portion extending in the stacking direction in the stacked body manifold is horizontal, a bottom portion of an opening on the valve side in the end plate unit flow path is arranged above the manifold bottom portion.

DETAILED DESCRIPTION

Figure 1:
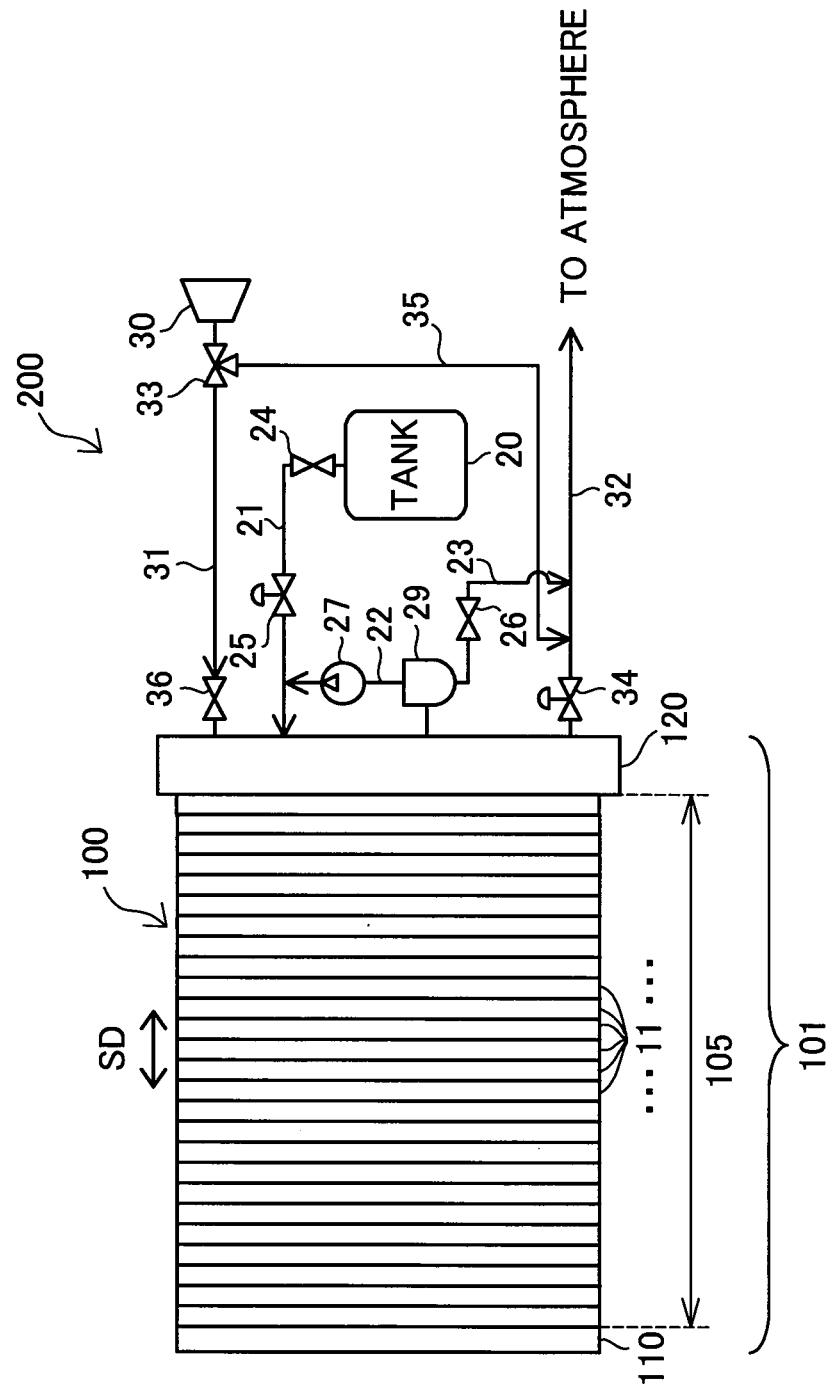
FIG. 1 is a block diagram illustrating a schematic configuration of a fuel cell system.

A. First Embodiment (A-1) Configuration of Fuel Cell System:

FIG. 1 is a block diagram illustrating a schematic configuration of a fuel cell system 200 with a fuel cell 100 according to a first embodiment of the disclosure. The fuel cell system 200 includes a fuel cell stack 101, a fuel gas supply system related to the action of supplying fuel gas to the fuel cell stack 101, and an oxidization gas supply system related to the action of supplying oxidization gas to the fuel cell stack 101. The fuel gas supply system includes a tank 20, a shutoff valve 24, an injector 25, a gas-liquid separator 29, an exhaust and drain valve 26, a circulation pump 27, a fuel gas supply path 21, a fuel gas circulation path 22, and a fuel gas discharge path 23. The oxidization gas supply system includes an air compressor 30, a three-way valve 33, a pressure regulating valve 34, a sealing valve 36, an oxidization gas supply path 31, an oxidization gas discharge path 32, and a bypass flow path 35. In addition, the fuel cell system 200 includes a mechanism (not illustrated) allowing a refrigerant to circulate in the fuel cell stack 101. The fuel cell 100 of the first embodiment includes at least the cell stack 101 and the pressure regulating valve 34, which are described above and an adaptor 38 described later. The pressure regulating valve 34 is also referred to as a "valve".

The fuel cell stack 101 includes a stacked body 105 with a plurality of stacked unit cells 11, and a pair of end plates 110, 120 arranged at both ends in a stacking direction SD of the stacked body 105. Although the illustration is omitted in FIG. 1, the stacked body 105 further includes, in addition to unit cells 11, a collecting plate (terminal) and an insulating plate (insulator) provided at each end. The collecting plate includes an output terminal, and is arranged to be in contact with a plurality of stacked unit cells. The insulating plate is arranged between the collecting plate and the end plates 110, 120, and insulates the stacked unit cells 11 from the end plates 110, 120. The fuel cell 100 of the first embodiment is a solid polymer fuel cell. However, it may be another kind of fuel cell such as a solid oxide fuel cell. The fuel cell 100 generates power with the supply of fuel gas containing hydrogen and oxidization gas containing oxygen. The fuel gas and the oxide gas are gas used in electrochemical reaction, and are also referred to as "reaction gas".

Figure 2:
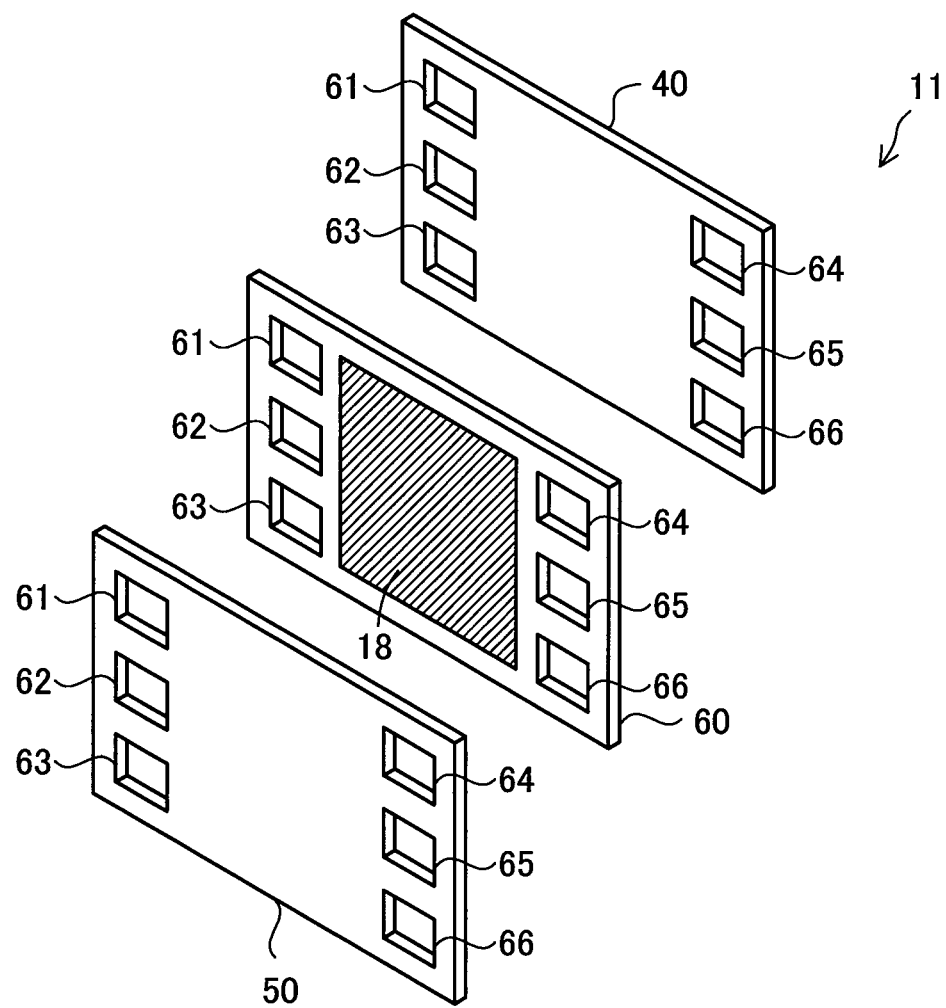
FIG. 2 is an exploded perspective view illustrating a schematic configuration of a unit cell.

FIG. 2 is an exploded perspective view illustrating a schematic configuration of the unit cell 11. The unit cell 11 includes a membrane electrode assembly (MEA), a pair of gas diffusion layers arranged to sandwich the MEA, a pair of gas separators 40, 50 arranged on the outside of each gas diffusion layer, and a resin frame 60. The MEA includes an electrolyte membrane, and an anode and a cathode that are catalyst electrode layers formed on each surface of the electrolyte membrane. The structure with a gas diffusion layer stacked on the MEA is also referred to as a membrane electrode gas diffusion layer assembly (MEGA) 18. The resin frame 60 is arranged between the gas separators 40, 50, and jointed to an outer periphery of the MEGA 18.

The electrolyte membrane forming the MEA is a proton conductive ion exchange membrane formed of a solid polymer material such as fluorine resin, for example, and exhibits preferable electron conductivity in a wet state. The cathode and the anode are layers formed on the electrolyte membrane, and include carbon particles carrying catalytic metal (e.g., platinum) accelerating electrochemical reaction, and a polyelectrolyte having proton conductivity. The gas diffusion layer is formed of a member having gas permeability and electron conductivity, and may be formed of a metal member such as foamed metal and metal mesh or a carbon member such as carbon cloth or carbon paper. The gas separator may be formed of a gas impermeable conductive member, including a carbon member such as dense carbon resulted by compressing carbon for gas impermeability and a metal member such as press-formed stainless steel, for example. The resin frame 60 is a frame-form member formed of thermoplastic resin. A sealing member (not illustrated), for example, may be arranged to seal a gap between the resin frame 60 and the gas separator 40, 50 adjacent to the resin frame 60.

In the unit cell 11, a flow path where fuel gas flows (anode-side flow path) is formed at an anode side, and a flow path where oxidization gas flows (cathode-side flow path) is formed at a cathode side, with the electrolyte membrane interposed. In the gas separators 40, 50, a surface facing the MEGA 18 has concaves and convexes for forming the anode-side flow path or the cathode-side flow path. However, FIG. 2 omits the illustration of such concaves and convexes. In the gas separators 40, 50, a back surface of the surface facing the MEGA 18 includes a refrigerant flow path (not illustrated).

Moreover, the gas separators 40, 50 and the resin frame 60 include, in the vicinity of the outer periphery thereof, manifold holes 61 to 66 that are through-holes for forming manifolds, at mutually overlapping positions in a stacking direction of the members including the MEGA 18 and the gas separators 40, 50 (same as the stacking direction SD). In FIG. 2, the outer peripheral shape of the gas separators 40, 50 and the resin frame 60 is a substantially same rectangular shape, and the manifold holes 61 to 66 also have a rectangular shape. However, the outer peripheral shape of the gas separators 40, 50 and the resin frame 60, and the shape of the manifold holes 61 to 66 may be an arbitrary shape other than the rectangular shape, such as a circular or oval shape. In the first embodiment, in a case where the gas separators 40, 50 and the resin frame 60 are stacked to form the unit cell 11, and a plurality of unit cells 11 are stacked to form the stacked body 105, the manifold holes 61 to 66 provided in the stacked members match and overlap each other among the stacked members, when viewed from a parallel direction to the stacking direction SD.

In the first embodiment, the manifold holes 61, 66 form a flow path (fuel gas manifold) for supplying and discharging fuel gas to and from the anode-side flow path of each unit cell 11. Moreover, the manifold holes 63, 64 form a flow path (oxidization gas manifold) for supplying and discharging oxidization gas to and from the cathode-side flow path of each unit cell 11. Moreover, the manifold holes 62, 65 form a flow path (refrigerant manifold) for supplying and discharging a refrigerant to and from a refrigerant flow path formed between the unit cells.

Returning to FIG. 1, the end plates 110, 120 are formed of a metal material such as aluminum, and are plate-type members with its thickness direction matching the stacking direction SD. The end plate 120 of the pair of end plates 110, 120 has six manifold holes same as those of the gas separators 40, 50 and the resin frame 60. The six manifolds of the end plate 120 are communicated to the corresponding manifolds formed by the manifold holes 61 to 66. The six manifold holes of the end plate 120 are connected to piping for supplying or discharging either fuel gas, oxidization gas, or a refrigerant to or from the fuel cell stack 101.

The tank 20 stores high-pressure hydrogen, and supplies hydrogen gas as fuel gas to the fuel cell stack 101 through the fuel gas supply path 21. The shutoff valve 24 is arranged in the vicinity of an outlet for discharging hydrogen gas from the tank 20 to the fuel gas supply path 21, and switches execution and stop of the supply of hydrogen gas from the tank 20 in accordance with orders from a controller (not illustrated). The injector 25 is arranged in the fuel gas supply path 21, and adjusts a supply amount (flow rate) and a pressure of hydrogen gas to the fuel cell stack 101. The anode off-gas discharged from the fuel cell stack 101 flows into the fuel gas circulation path 22. The fuel gas circulation path 22 includes the gas-liquid separator 29. The gas-liquid separator 29 separates liquid water from anode off-gas. The fuel gas circulation path 22 is connected to the fuel gas supply path 21. The circulation pump 27 is arranged in the fuel gas circulation path 22 to pressurize fuel gas after separating liquid water by the gas-liquid separator 29, and feeds it to the fuel gas supply path 21. The fuel gas flowing from the fuel gas circulation path 22 into the fuel gas supply path 21 is supplied again to the fuel cell stack 101 together with fuel gas supplied from the tank 20. The exhaust and drain valve 26 is provided in the fuel gas discharge path 23 connected to the gas-liquid separator 29, and switches execution and stop of the discharge of liquid water and anode off-gas from the gas-liquid separator 29 to the fuel gas discharge path 23.

The air compressor 30 is connected to the fuel cell stack 101 through the oxidization gas supply path 31, and supplies air as oxidization gas to the fuel cell stack 101. The three-way valve 33 is provided at a branching portion where the bypass flow path 35 branches from the oxidization gas supply path 31, and adjusts, among the entire amount of air supplied from the air compressor 30, an amount of air supplied to the fuel cell stack 101 through the oxidization gas supply path 31 and an amount of air flowing into the bypass flow path 35. The cathode off-gas discharged from the fuel cell stack 101 flows into the oxidization gas discharge path 32 with the end on the downstream side being open to the atmosphere. The above-described fuel gas discharge path 23 as well as the bypass flow path 35 are connected to the oxidization gas discharge path 32. Thus, the anode off-gas discharged through the fuel gas discharge path 23 is diluted by cathode off-gas discharged to the oxidization gas discharge path 32 from the fuel cell stack 101 and oxidization gas supplied from the bypass flow path, and then discharged to the atmosphere. The pressure regulating valve 34 is arranged at a connection portion between the fuel cell stack 101 and the oxidization gas discharge path 32, and adjusts a pressure (so-called back pressure) on the cathode discharge side of the fuel cell stack 101 to adjust a cathode-side pressure of each unit cell 11. The closing of the pressure regulating valve 34 cuts off the communicating state between the oxidization gas discharge path 32 and the cathode-side flow path in the fuel cell stack. The form of the arrangement of the pressure regulating valve 34 will be described later in detail. The sealing valve 36 is arranged at a connection portion between the fuel cell stack 101 and the oxidization gas supply path 31. The closing of the sealing valve 36 cuts off the communicating state between the oxidization gas supply path 31 and the cathode-side flow path in the fuel cell stack.

While the fuel cell system 200 is stopped, the anode-side flow path in the fuel stack 101 is scavenged by fuel gas, and the cathode-side flow path is scavenged by oxidization gas. Thereafter, the anode-side flow path in the fuel cell stack 101 is sealed by closing the valve in the injector 25 and the exhaust and drain valve 26. Moreover, the cathode-side flow path in the fuel cell stack 101 is sealed by closing the sealing valve 36 and the pressure regulating valve 34.

The fuel cell system 200 further includes a controller (not illustrated). The controller includes a central processing unit (CPU), a read-only memory (ROM), a random access memory (RAM), and an input-output port. The controller acquires output signals from a sensor (not illustrated) provided in parts of the fuel cell system 200, and outputs drive signals to the parts related to power generation of the fuel cell system 200. To be more specific, the controller outputs drive signals to the above-described air compressor 30 or circulation pump 27, or valves of the parts.

Figure 3:
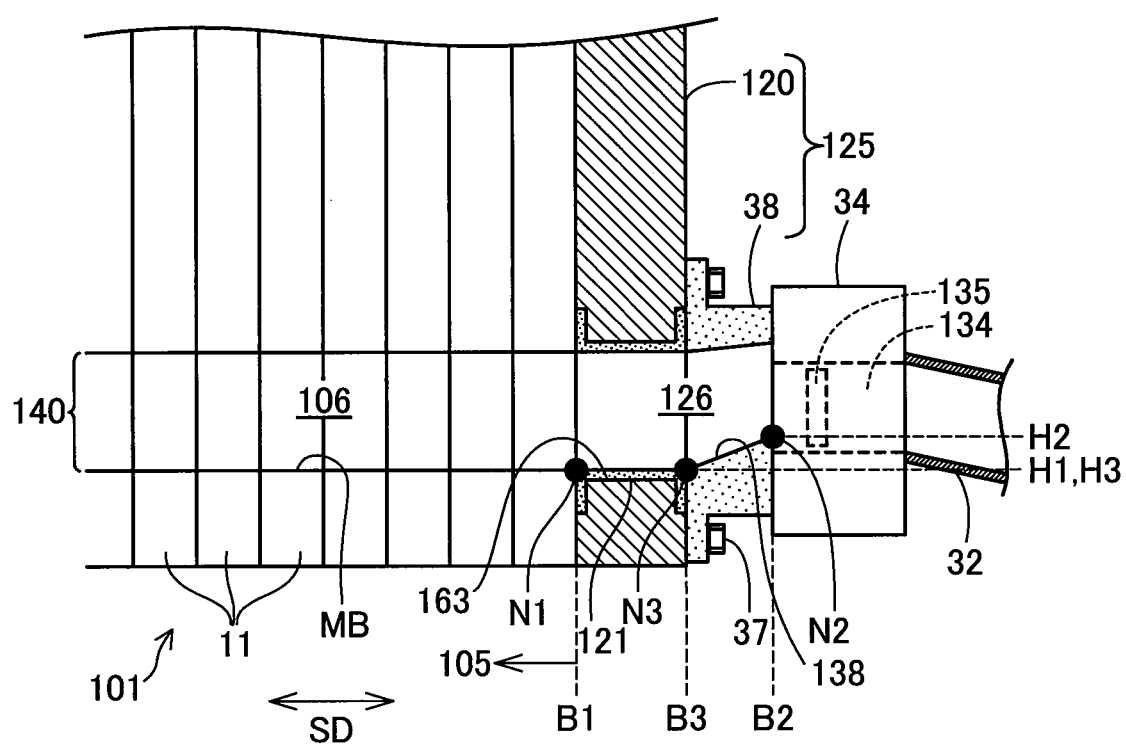
FIG. 3 is a section view schematically illustrating a configuration of the vicinity of an attachment portion of a pressure regulating valve.

(A-2) Configuration of Vicinity of Attachment Portion of Pressure Regulating Valve FIG. 3 is a section view enlargedly and schematically illustrating a configuration of the vicinity of an attachment portion of the pressure regulating valve 34 to the fuel cell stack 101. FIG. 3 illustrates the state in which the fuel cell stack 101 is arranged so that the manifold formed in the fuel cell stack 101 extends in a horizontal direction. The first embodiment is characterized in the shape of the gas flow path from the fuel cell stack 101 to the pressure regulating valve 34.

In the first embodiment, the manifold hole 63 forms an oxidization gas discharge manifold 140. Moreover, the end plate 120 has a manifold hole 163 for forming a part of the oxidization gas discharge manifold 140 at a position mutually overlapping the manifold hole 63 of the gas separators 40, 50 and the resin frame 60 in the stacking direction SD. On a back surface of the surface facing the stacked body 105 in the end plate 120, the adaptor 38 is attached at the position overlapping the manifold hole 163, and the pressure regulating valve 34 is provided between the adaptor 38 and the oxidization gas discharge path 32. That is, the adaptor 38 connects between the end plate 120 and the pressure regulating valve 34. The adaptor 38 has a flow path hole 138 forming an in-adaptor flow path where oxidization gas (cathode off-gas) flows.

The end plate 120 and the adaptor 38 are collectively referred to as an end plate unit 125. In the end plate unit 125, a flow path formed by the manifold hole 163 of the end plate 120 and the flow path hole 138 of the adaptor 38 is referred to as an end plate unit flow path 126. In the stacked body 105, a flow path formed by the manifold hole 63 of the gas separators 40, 50 and the resin frame 60 is referred to as a stacked body manifold 106. The oxidization gas discharge manifold 140 of the first embodiment is a flow path where oxidization gas flows. The oxidization gas discharge manifold 140 of the first embodiment includes the stacked body manifold 106 and the end plate unit flow path 126, and penetrates the stacked body 105 and the end plate unit 125 in the stacking direction SD in which oxidization gas flows.

The adaptor 38 is screwed to the end plate 120 using a plurality of bolts 37. The pressure regulating valve 34 includes an in-valve flow path 134 communicating the in-adaptor flow path and the oxidization gas discharge path 32, and a valve element 135 opening and closing the in-valve flow path 134. The oxidization gas discharge path 32 is also referred to as "gas piping".

The end plate unit 125 of the first embodiment includes, on an inner wall surface of the manifold hole 163, a resin layer 121 covering an inner wall surface of the manifold hole 163 and forming an inner wall surface of the end plate unit flow path 126. In the end plate 120, the same resin layer (not illustrated) is formed also on the inner wall surface of other manifold holes provided corresponding to the manifold holes 61, 62, 64 to 66.

The resin layer 121 is formed of insulating resin, and has a function of preventing short circuit between the stacked body 105 and the end plate 120. The resin forming the resin layer 121 may be any resin having resistance to a use temperature of the fuel cell stack 101, and may be thermosetting resin such as epoxy resin and phenol resin, or thermoplastic resin such as polypropylene, polyethylene, and polyamide, for example. In the first embodiment, the resin layer 121 is formed integrally to the end plate 120 by insert molding. However, the resin layer 121 may be formed by a different method. As illustrated in FIG. 3, the resin layer 121 may include, on a stack surface of the end plate 120 (at least one of the surface in contact with the stacked body 105 and the surface in contact with the adaptor 38), a part expanding in the outer periphery direction of the end plate 120 from the manifold hole 163.

The adaptor 38 is formed of insulating resin, and secures insulation between the end plate 120 and the pressure regulating valve 34. The thickness of the adaptor 38, that is, the distance between the end plate 120 and the pressure regulating valve 34 is set appropriately to secure the insulation between the end plate 120 and the pressure regulating valve 34. The resin forming the adaptor 38 includes, for example, thermosetting resin such as epoxy resin and phenol resin, or thermoplastic resin such as polypropylene, AS resin, ABS resin, acrylic resin, fluororesin and polyamide, for example. Alternatively, the resin forming the adaptor 38 may include elastomer such as silicon rubber, fluororubber, and butyl rubber.

In the first embodiment, the manifold hole 163 provided to penetrate the end plate 120 in the thickness direction has a constant inner diameter. Moreover, the resin layer 121 formed on the inner wall surface of the manifold hole 163 is formed to have a constant thickness. Furthermore, the flow path hole 138 formed in the adaptor 38 has a shape gradually reducing in diameter from the side in contact with the end plate 120 toward the side in contact with the pressure regulating valve 34. In the fuel cell stack 101, the manifold hole 63 in the stacked body 105 and the manifold hole 163 formed in the end plate 120 match and overlap each other. Moreover, the opening on the adaptor 38 side of the manifold hole 163 in the end plate 120 and the opening on the end plate 120 side of the flow path hole 138 in the adaptor 38 match and overlap each other.

FIG. 3 illustrates a bottom portion extending in the stacking direction SD in the stacked body manifold 106 as a manifold bottom portion MB, and the fuel cell stack 101 is arranged so that the manifold bottom portion MB is horizontal, as described above. The manifold bottom portion MB is a region connecting portions positioned on the lowest side in the section vertical to the stacking direction SD of the stacked body manifold 106.

FIG. 3 illustrates positions of a first boundary B1 that is a boundary between the stacked body 105 and the end plate 120, a second boundary B2 that is a boundary between the adaptor 38 and the pressure regulating valve 34, and a third boundary B3 that is a boundary between the end plate 120 and the adaptor 38. Moreover, FIG. 3 illustrates, in the oxidization gas discharge manifold 140, a lowest position in the first boundary B1 as a first bottom portion N1, a lowest position in the second boundary B2 as a second bottom portion N2, and a lowest position in the third boundary B3 as a third bottom portion N3. Furthermore, FIG. 3 illustrates the vertical heights of the first bottom portion N1, the second bottom portion N2, and the third bottom portion N3 by dotted lines H1, H2, and H3, respectively. In the first embodiment, the second bottom portion N2 is arranged above the first bottom portion N1, as illustrated in FIG. 3. That is, when the fuel cell stack 101 is arranged so that the manifold bottom portion MB is horizontal, the second bottom portion N2 that is a bottom portion of the opening on the pressure regulating valve 34 side in the end plate unit flow path 126 is arranged above the manifold bottom portion MB. The vertical height of the third bottom portion N3 is substantially same as that of the first bottom portion N1, and is arranged below the second bottom portion N2, similarly to the first bottom portion N1.

In the fuel cell 100 of the first embodiment configured in the above-described manner, when the fuel cell stack 101 is arranged so that the manifold bottom portion MB is horizontal, the bottom portion of the opening on the pressure regulating valve 34 side in the end plate unit flow path 126 is arranged above the manifold bottom portion MB. Thus, even when liquid water occurs in the stacked body manifold 106 after the fuel cell 100 stops power generation, it is possible to prevent the occurred liquid water from flowing into the in-valve flow path 134 of the pressure regulating valve 34. That is, the second bottom portion N2 is positioned above the manifold bottom portion MB of the oxidization gas discharge manifold 140, which prevents liquid water from outflowing the second bottom portion N2 into the pressure regulating valve 34. As a result, even when the environmental temperature is lowered to below zero after the fuel cell 100 stops power generation, it is possible to prevent freezing of liquid water in the pressure regulating valve 34. That is, it is possible to prevent freezing of the closed valve element 135. Therefore, at the next activation of the fuel cell 100, it is possible to prevent problems in activation operation due to freezing of the pressure regulating valve 34.

While the fuel cell 100 stops power generation, the cathode-side flow path in the fuel cell stack 101 is scavenged by oxidization gas, as described above. Thus, liquid water in the oxidization gas discharge manifold 140 is discharged to the outside of the fuel cell stack 101. However, when the fuel cell 100 stops power generation and then the environmental temperature is lowered, for example, the liquid water may be condensed in the cathode-side flow path. Moreover, after scavenging by the oxidization gas, water contained in the electrolyte membrane of each unit cell 11 may be impregnated to the oxidization gas discharge manifold 140 from the unit cell 11. The amount of condensed liquid water or impregnated liquid water occurring in such manners is relatively small. However, if such liquid water flows into the pressure regulating valve 34 and is frozen therein, it may prevent opening of the pressure regulating valve 34 at the next activation. In the fuel cell 100 of the first embodiment, the second bottom portion N2 is arranged above the first bottom portion N1, which makes it possible to dam the above-described liquid water at the outlet of the oxidization gas discharge manifold 140.

Figure 4:
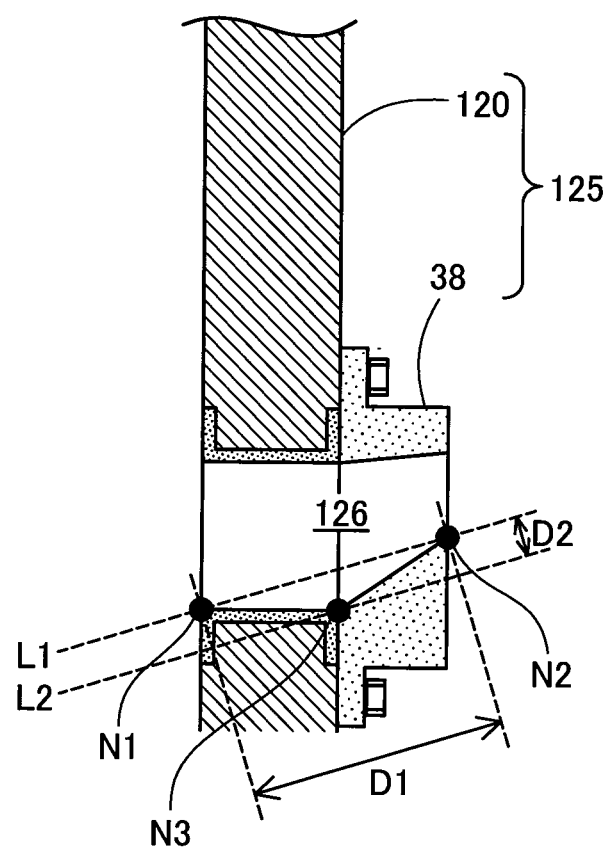
FIG. 4 is an explanatory diagram enlargedly illustrating a connection portion between an end plate and an adapter.

FIG. 4 is an explanatory diagram enlargedly illustrating a connection portion between the end plate 120 and the adapter 38 in FIG. 3. FIG. 4 illustrates a straight line connecting the first bottom portion N1 and the second bottom portion N2 as a line L1, and a distance between the first bottom portion N1 and the second bottom portion N2 as a distance D1. Moreover, FIG. 4 also illustrates a straight line that is in parallel to the line L1 and passes the third bottom portion N3 as a line L2, and a distance between the line L1 and the line L2 as a distance D2. As the shape from the first bottom portion N1 to the second bottom portion N2 in the flow path where cathode off-gas flows, the distance D2 is preferably large relative to the distance D1 to improve the effect of retaining liquid water and suppressing a flow of the liquid water into the pressure regulating valve 34. From such a viewpoint, the value of a ratio of the distance D2 relative to the distance D1 (D2/D1) is preferably equal to or larger than ⅙, and more preferably equal to or larger than ⅕. Moreover, as the shape from the first bottom portion N1 to the second bottom portion N2 in the flow path where cathode off-gas flows, the distance D2 is preferably small relative to the distance D1 to discharge produced water occurring during power generation of the fuel cell 100 to the outside of the fuel cell stack 101 using a flow of oxidization gas. From such a viewpoint, the value of a ratio of the distance D2 relative to the distance D1 (D2/D1) is preferably equal to or smaller than ¹⁄₁, more preferably equal to or smaller than ½, and still more preferably equal to or smaller than ⅓, for example.

B. Second Embodiment

Figure 5:
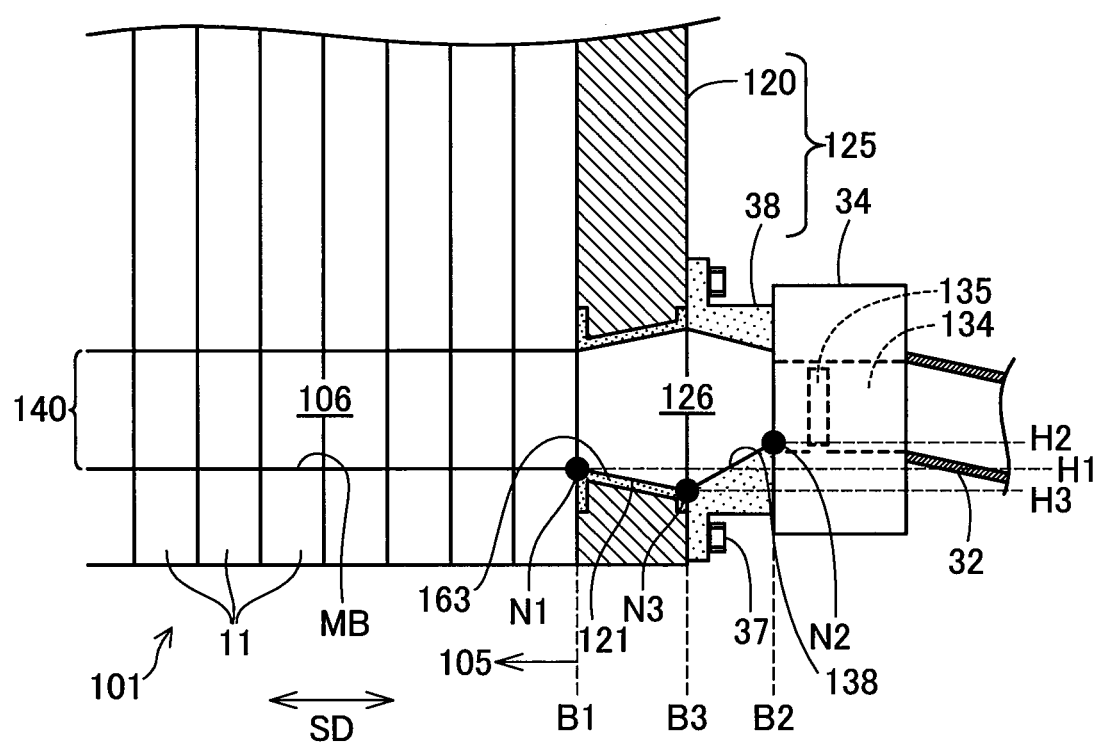
FIG. 5 is an explanatory diagram illustrating a configuration of a fuel cell according to a second embodiment, similarly to FIG. 3.

FIG. 5 is an explanatory diagram illustrating a configuration of the fuel cell 100 according to the second embodiment, similarly to FIG. 3. The fuel cell 100 of the second embodiment has the same configuration as the first embodiment except for the shape of a flow path formed in the end plate 120 and the adaptor 38. Thus, the common parts will be represented with the same reference numerals.

In the second embodiment, the manifold hole 163 provided in the end plate 120 has a shape gradually increasing in diameter from the end on the stacked body 105 side toward the end on the adaptor 38 side. Moreover, the flow path hole 138 formed in the adaptor 38 has a shape gradually reducing in diameter from the side in contact with the end plate 120 toward the side in contact with the pressure regulating valve 34. At the third boundary B3 that is a boundary between the end plate 120 and the adaptor 38, the opening of the manifold hole 163 where the resin layer 121 is formed and the opening of the flow path hole 138 match and overlap each other.

In such a configuration, when the fuel cell stack 101 is arranged so that the manifold bottom portion MB is horizontal, the third bottom portion N3 exists as a region arranged below the manifold bottom portion MB (below the first bottom portion N1 of the first boundary B1) in the end plate unit flow path 126. Therefore, it is possible to improve the function of retaining liquid water before the second boundary B2 that is a boundary between the adaptor 38 and the pressure regulating valve 34 in the vicinity of the outlet of the oxidization gas discharge manifold 140 and improve the effect of suppressing a flow of liquid water into the pressure regulating valve 34. In the end plate unit flow path 126, the third bottom portion N3 that is a region arranged below the manifold bottom portion MB is also referred to as a "first lower portion".

Moreover, in the second embodiment, the inner diameter of the manifold hole 163 is formed so that the diameter of the opening at the third boundary B3 in contact with the adaptor 38 is largest. This exerts the effect of facilitating the action of formation of the resin layer 121 covering the inner wall surface of the manifold hole 163.

Figure 6:
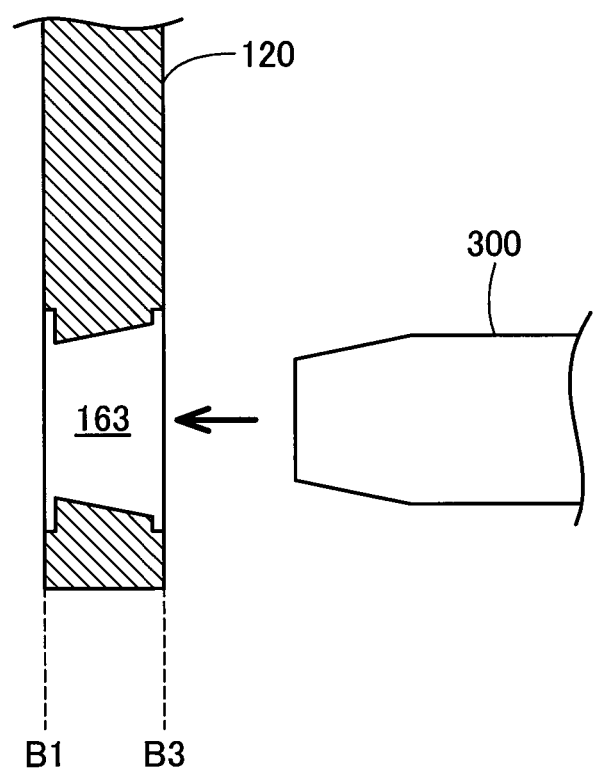
FIG. 6 is an explanatory diagram illustrating the action of insert molding of a resin layer.

FIG. 6 is an explanatory diagram illustrating the operation of insert molding of the resin layer 121. To form the resin layer 121, a shaping mold 300 gradually reducing in diameter toward the end is inserted from the opening on the adaptor 38 side with a larger diameter (third boundary B3 side) into the manifold hole 163 for insert molding. In such a configuration, it is possible to easily form the resin layer 121 without any complicated processing, unlike the case in which a lowest part in the manifold hole 163 is provided in a middle part between the first boundary B1 and the third boundary B3, for example.

C. Third Embodiment

Figure 7:
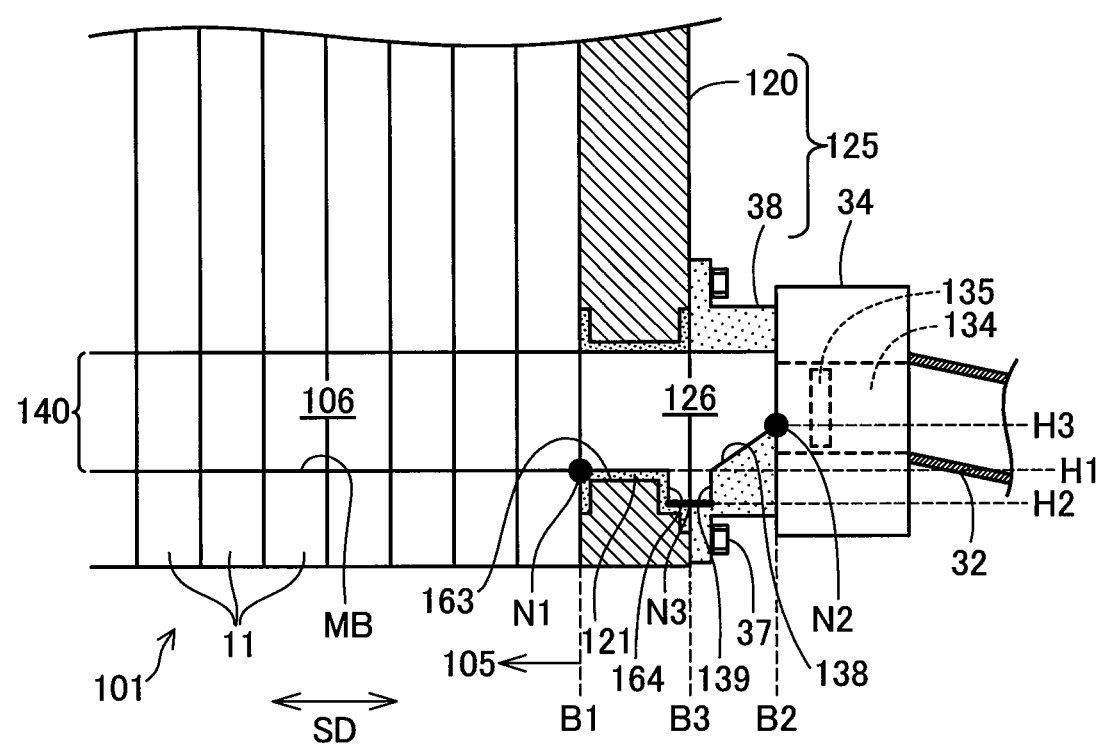
FIG. 7 is an explanatory diagram illustrating a configuration of a fuel cell according to a third embodiment, similarly to FIG. 3.

FIG. 7 is an explanatory diagram illustrating a configuration of the fuel cell 100 according to the third embodiment, similarly to FIG. 3. The fuel cell 100 of the third embodiment has the same configuration as the first embodiment except for the shape of a flow path formed in the end plate 120 and the adaptor 38. Thus, the common parts will be represented with the same reference numerals.

In the third embodiment, the manifold hole 163 provided in the end plate 120 includes, at the end including the third boundary B3 in contact with the adaptor 38, a step portion 164 that is recessed downward from other part. Then, the flow path hole 138 formed in the adaptor 38 includes, at the end including the third boundary B3 in contact with the end plate 120, a step portion 139 that is recessed downward from other part. At the third boundary B3 that is a boundary between the end plate 120 and the adaptor 38, the opening of the manifold hole 163 where the resin layer 121 is formed and the opening of the flow path hole 138 match and overlap each other. Thus, between the manifold hole 163 and the flow path hole 138, the above-described step portion 164 and step portion 139 form the first lower portion arranged below the manifold bottom portion MB, including the third bottom portion N3 of the third boundary B3.

Also in such a configuration, the first lower portion arranged below the manifold bottom portion MB is provided between the first boundary B1 and the second boundary B2, similarly to the second embodiment. Thus, it is possible to improve the function of retaining liquid water before the second boundary B2 and improve the effect of suppressing a flow of liquid water into the pressure regulating valve 34. Moreover, to form the resin layer 121, a shaping mold is inserted from the opening on the third boundary B3 side with a larger diameter in the manifold hole 163 into the manifold hole 163 for insert molding, which makes it possible to easily form the resin layer 121.

D. Fourth Embodiment

Figure 8:
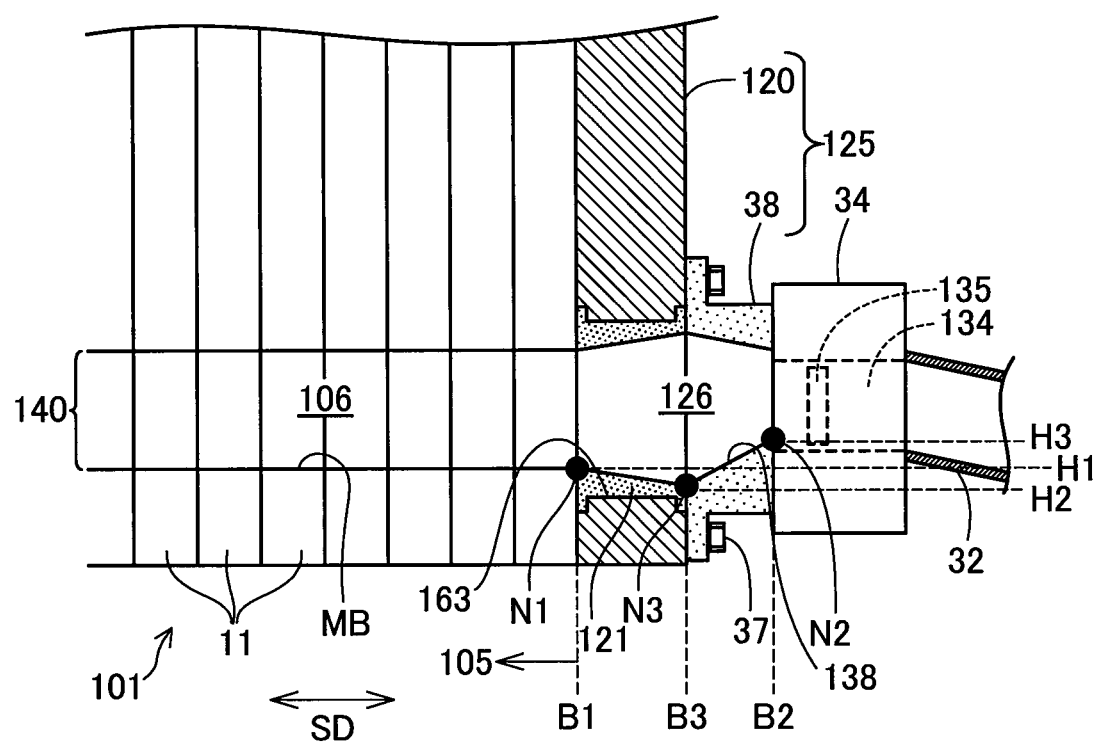
FIG. 8 is an explanatory diagram illustrating a configuration of a fuel cell according to a fourth embodiment, similarly to FIG. 3.

FIG. 8 is an explanatory diagram illustrating a configuration of the fuel cell 100 according to the fourth embodiment, similarly to FIG. 3. The fuel cell 100 of the fourth embodiment has the same configuration as the first embodiment except for the shape of a flow path formed in the end plate 120 and the adaptor 38. Thus, the common parts will be represented with the same reference numerals.

In the fourth embodiment, the manifold hole 163 provided in the end plate 120 has a substantially constant inner diameter, and the thickness of the resin layer 121 is formed to be larger on the first boundary B1 side and thinner on the third boundary B3 side. In this manner, the gas flow path formed by the manifold hole 163 where the resin layer 121 is formed gradually increases in diameter from the first boundary B1 side toward the third boundary B3 side, similarly to the second embodiment. The flow path hole 138 formed in the adaptor 38 has the same shape as the second embodiment.

In such a configuration, when the fuel cell stack is arranged so that the manifold bottom portion MB is horizontal, the third bottom portion N3 is the first lower portion arranged below the manifold bottom portion MB in the end plate unit flow path 126, which exerts the same effects as the second embodiment. Moreover, to form the resin layer 121, a shaping mold gradually reducing in diameter toward the end is inserted from the opening on the third boundary B3 side in the manifold hole 163 into the manifold hole 163 for insert molding, which makes it possible to easily form the resin layer 121.

E. Fifth Embodiment

Figure 9:
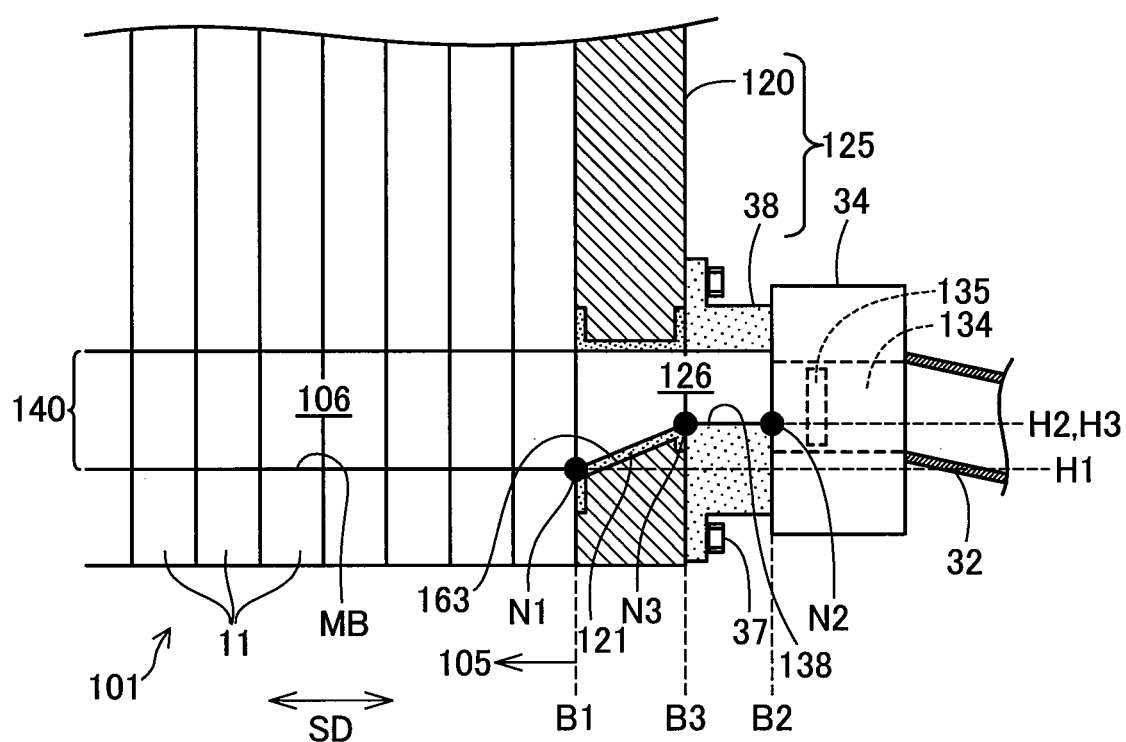
FIG. 9 is an explanatory diagram illustrating a configuration of a fuel cell according to a fifth embodiment, similarly to FIG. 3.

FIG. 9 is an explanatory diagram illustrating a configuration of the fuel cell 100 according to the fifth embodiment, similarly to FIG. 3. The fuel cell 100 of the fifth embodiment has the same configuration as the first embodiment except for the shape of a flow path formed in the end plate 120 and the adaptor 38. Thus, the common parts will be represented with the same reference numerals.

In the fifth embodiment, the manifold hole 163 provided in the end plate 120 gradually reduces in diameter from the first boundary B1 side toward the third boundary B3 side. Moreover, the flow path hole 138 forming the in-adaptor flow path in the adaptor 38 has a constant inner diameter. At the third boundary B3 that is a boundary between the end plate 120 and the adaptor 38, the opening of the manifold hole 163 where the resin layer 121 is formed and the opening of the flow path hole 138 match and overlap each other. In the above-described configuration, when the fuel cell stack 101 is arranged so that the manifold bottom portion MB is horizontal, the manifold bottom portion MB is in the lowest position in the oxidization gas discharge manifold 140.

In such a configuration, when the fuel cell stack 101 is arranged so that the manifold bottom portion MB is horizontal, the second bottom portion N2 at the second boundary B2 is arranged above the manifold bottom portion MB, which exerts the same effects as the first embodiment. Moreover, to form the resin layer 121, a shaping mold gradually reducing in diameter toward the end may be inserted from the opening on the first boundary B1 side in the manifold hole 163 into the manifold hole 163 for insert molding, which makes it possible to easily form the resin layer 121.

In FIG. 9, the shape of the manifold hole 163 provided in the end plate 120 gradually reduces in diameter from the first boundary B1 side toward the third boundary B3 side. However, the embodiment may have a different configuration. For example, as in the fourth embodiment illustrated in FIG. 8, the inner diameter of the manifold hole 163 may be constant, while the thickness of the resin layer 121 may be thinner on the first boundary B1 side and thicker on the third boundary B3 side. That is, it is sufficient if the inner diameter of the resin layer 121 gradually reduces from the first boundary B1 toward the adaptor 38 side. Also in such a configuration, it is possible to obtain the same effects as the fuel cell 100 of FIG. 9.

F. Sixth Embodiment

Figure 10:
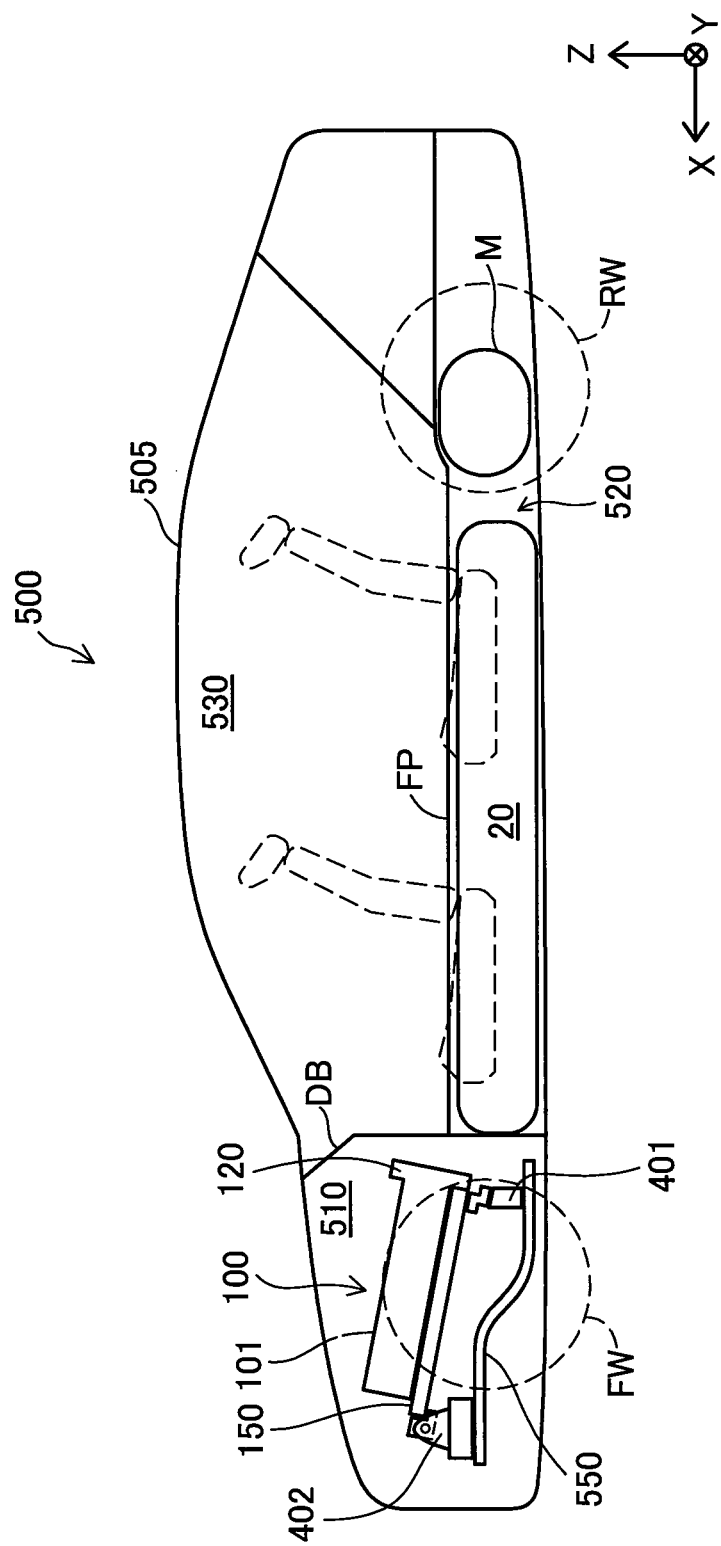
FIG. 10 is an explanatory diagram illustrating a schematic configuration of a fuel cell vehicle.

FIG. 10 is an explanatory diagram illustrating a schematic configuration of a fuel cell vehicle 500 with the fuel cell 100 according to the sixth embodiment. FIG. 10 illustrates XYZ axes orthogonal to one another. The X-axis direction indicates a horizontal direction, and +X-axis direction corresponds to a travelling direction of the fuel cell vehicle 500. The Z-axis direction indicates a vertical direction, and +Z-axis direction is also referred to as "vertically upward", while −Z-axis direction is also referred to as "vertically downward". The Y-axis direction indicates a width direction of the fuel cell vehicle 500.

The fuel cell vehicle 500 includes a vehicle body 505, a pair of front wheels FW, and a pair of rear wheels RW. The vehicle body 505 includes a front compartment 510, a vehicle interior 530, and an underfloor part 520. The front compartment 510 is divided from the vehicle interior 530 and the underfloor part 520 by a dashboard DB. The vehicle interior 530 is divided from the underfloor part 520 by a floor panel FP.

In the sixth embodiment, the fuel cell 100 is arranged in the front compartment 510. In the front compartment 510, there are further arranged an air compressor 30, the gas-liquid separator 29, and the circulation pump 27 (see FIG. 1) (not illustrated). The vehicle interior 530 is space where a driver of the fuel cell vehicle 500, for example, is seated. In the underfloor part 520, there is arranged the tank 20 (see FIG. 1) storing hydrogen gas used for power generation of the fuel cell 100. Moreover, a drive motor M is arranged between the right and left rear wheels RW. The drive motor M generates driving force for travelling with the supply of power from the fuel cell 100. The arrangement of the components of the fuel cell system 200 in the fuel cell 100 is not limited to the arrangement illustrated in FIG. 10, and may be different.

In the front compartment 510, there are arranged, in the width direction of the vehicle, a pair of suspension members 550 extending in the front-rear direction of the vehicle. The suspension member 550 is a member forming a part of the vehicle body 505. In the sixth embodiment, the suspension member 550 has a bending shape so that the rear end (end in the −X-axis direction) of the suspension member 550 is positioned below the front end (end in the X-axis direction) of the suspension member 550. A front mount portion 402 is connected to the vicinity of the front end of the suspension member 550 positioned above, while a rear mount portion 401 is connected to the vicinity of the rear end of the suspension member 550 positioned below. The suspension member 550 is also referred to as a "supporting member". The front mount portion 402 and the rear mount portion 401 are also referred to as "fixing members".

The fuel cell stack 101 is supported from the lower side by a support frame 150 that is a plate member. The vicinity of the front end of the support frame 150 is supported by the front mount portion 402, and the vicinity of the rear end of the support frame 150 is supported by the rear mount portion 401. As described above, the suspension member 550 has a bending shape. Thus, the support frame 150 is inclined relative to the horizontal direction so that the rear end (end in the −X-axis direction) of the support frame 150 is positioned below the front end (end in the X-axis direction) of the support frame 150. In the fuel cell stack 101 supported on the support frame 150, the end plate 120 is arranged on the rear end side, while the end plate 110 is arranged on the front end side. That is, the front mount portion 402 and the rear mount portion 401 as fixing members fix the fuel cell stack 101 to the suspension members 550 as support members so that the stacked body manifold 106 is tilted downward in the flow direction of oxidization gas.

Figure 11:
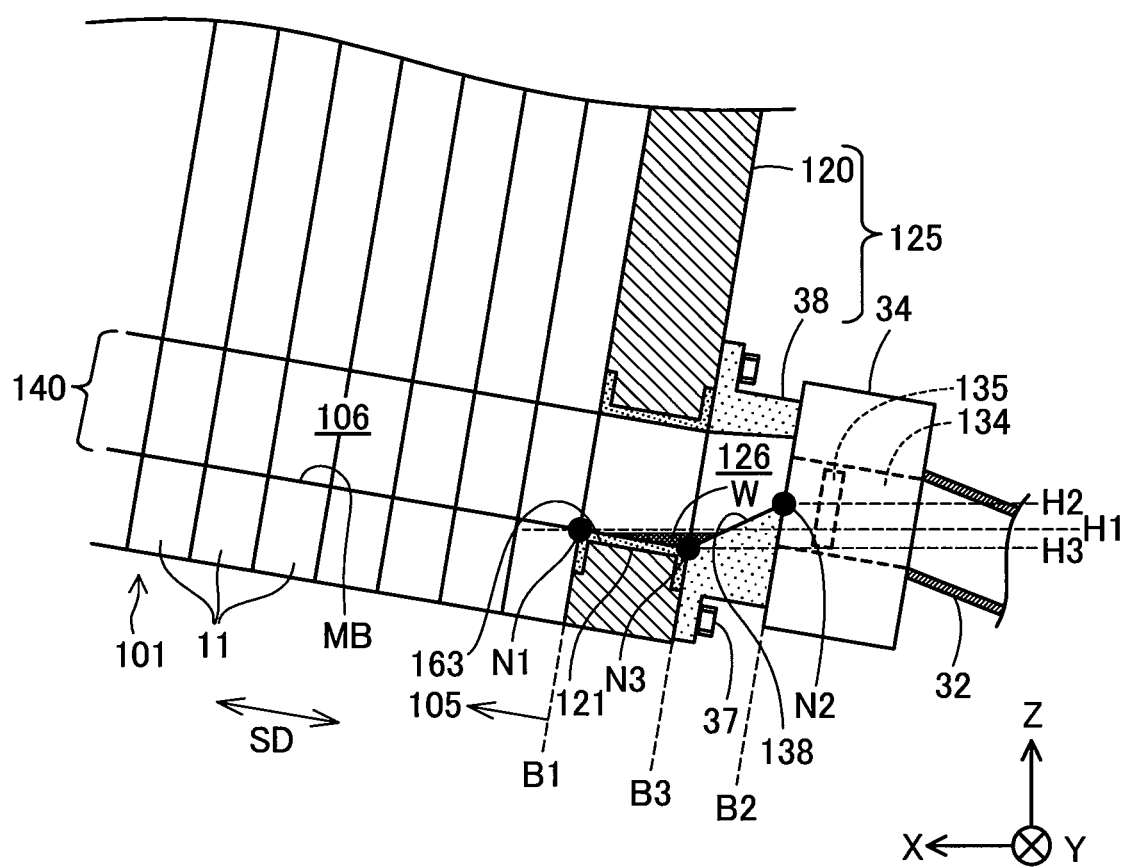
FIG. 11 is an explanatory diagram illustrating a configuration of a fuel cell according to a sixth embodiment, similarly to FIG. 3.

FIG. 11 is an explanatory diagram illustrating a configuration of the fuel cell 100 mounted in the fuel cell vehicle 500, similarly to FIG. 3. The fuel cell 100 of the sixth embodiment has the same configuration as the fuel cell 100 illustrated in FIG. 3. However, as described above, the stacked body manifold 106 is tilted downward in the flow direction of oxidization gas. FIG. 11 illustrates the vertical heights of the first bottom portion N1, the second bottom portion N2, and the third bottom portion N3 by dotted lines H1, H2, and H3, respectively. In the sixth embodiment, in a flow path of oxidization gas in the state where the fuel cell stack 101 is arranged to be inclined in the above-described manner, the second bottom portion N2 at the second boundary B2 is positioned above the first bottom portion N1 at the first boundary B1. That is, the bottom portion of the opening on the pressure regulating valve 34 side in the end plate unit flow path 126 is arranged above the end on the end plate unit 125 side in the manifold bottom portion MB. Thus, it is possible to suppress a flow of liquid water from the oxidization gas discharge manifold 140 side into the pressure regulating valve 34.

Moreover, in the sixth embodiment, in the end plate unit flow path 126 in the state where the fuel cell stack 101 is arranged to be inclined in the above-described manner, the third bottom portion N3 is arranged below the first bottom portion N1 and the second bottom portion N2. That is, the third bottom portion N3 is arranged below the end on the end plate unit 125 side in the manifold bottom portion MB and the bottom portion of the opening on the pressure regulating valve 34 side in the end plate unit flow path 126. Therefore, it is possible to improve the function of retaining liquid water before the second boundary B2 that is a boundary between the adaptor 38 and the pressure regulating valve 34 in the vicinity of the outlet of the oxidization gas discharge manifold 140 and improve the effect of suppressing a flow of liquid water into the pressure regulating valve 34. FIG. 11 illustrates the state in which liquid water W is retained at a region including the third bottom portion N3. In the end plate unit flow path 126 of the fuel cell 100 fixed to the support member by a fixing member, the third bottom portion N3 that is a region arranged below the first bottom portion N1 and the second bottom portion N2 is also referred to as a "second lower portion".

Furthermore, in the sixth embodiment, the fuel cell stack 101 is inclined in the above-described manner, and thus the stacked body manifold 106 is tilted downward in the flow direction of oxygen gas. Thus, it is possible to promote discharge from the fuel cell stack 101 through the stacked body manifold 106, and facilitate discharge to the outside of the fuel cell 100 using a flow of oxidization gas during power generation of the fuel cell 100.

FIG. 11 illustrates the case in which the fuel cell 100 of the first embodiment illustrated in FIG. 3 is used. However, the fuel cell 100 of another embodiment may be inclined in the same manner and mounted in the fuel cell vehicle 500. Alternatively, in a fuel cell mounted device of a different kind from a vehicle with a fuel cell as a driving power source, the fuel cell 100 may be inclined in the same manner as the sixth embodiment and mounted.

G. Other Embodiments (G1) In the above-described embodiments, when the fuel cell stack 101 is arranged so that the manifold bottom portion MB of the stacked body manifold 106 is horizontal, the first bottom portion N1 of the first boundary B1 (fifth embodiment), the third bottom portion N3 of the third boundary B3 (second to fourth embodiments), or the entire bottom portion of the manifold hole 163 (first embodiment) is lowest in the end plate unit flow path 126. However, the embodiment may have a different configuration. For example, a lowest region in the end plate unit flow path 126 may exist between the first bottom portion N1 and the third bottom portion N3 in the manifold hole 163 or between the third bottom portion N3 and the second bottom portion N2 in the flow path hole 138 of the adaptor 38. Moreover, between the first bottom portion N1 and the second bottom portion N2, there may exist a portion where the vertical height of the bottom portion of the end plate unit flow path 126 is gradually lowered, a portion where such a height is gradually increased, and a portion where such a height is gradually lowered in this order from the first boundary B1 toward the second boundary B2 side. If the second bottom portion N2 is arranged above the manifold bottom portion MB when the fuel cell stack 101 is arranged so that the manifold bottom portion MB of the stacked body manifold 106 is horizontal, it is possible to obtain the same effects as the embodiments.

(G2) In the above-described embodiments, the end plate unit 125 includes the adaptor 38. However, the embodiment may have a different configuration. For example, a housing of the pressure regulating valve 34 may be formed of an insulating material, so that the pressure regulating valve 34 is directly attached to the end plate 120 without the adaptor 38. Alternatively, an insulating sheet may be attached on a surface on the pressure regulating valve 34 side of the end plate 120, so that the pressure regulating valve 34 is attached to the end plate 120 through such an insulating sheet. Even in such cases, if the bottom portion of the opening on the pressure regulating valve 34 side in the end plate unit flow path 126 is arranged above the manifold bottom portion MB when the fuel cell stack 101 is arranged so that the manifold bottom portion MB is horizontal, it is possible to obtain the same effects as the embodiments. The end plate unit 125 may include a member other than the adaptor 38.

(G3) In the above-described embodiments, the manifold hole 63 of the gas separators 40, 50, and the resin frame 60, and the manifold hole 163 of the end plate 120 match and overlap each other in the stacking direction SD, and the oxidization gas discharge manifold 140 has a constant inner diameter. However, the embodiment may have a different configuration. For example, the inner diameter of the stacked body manifold 106 may be changed in the middle. Even in such a case, if the second bottom portion N2 at the second boundary B2 is arranged above the manifold bottom portion MB when the fuel cell stack 101 is arranged so that the manifold bottom portion MB is horizontal, it is possible to obtain the same effects as the embodiments.

(G4) In the above-described embodiments, there has been described the shape of the end plate unit flow path 126 in the oxidization gas discharge manifold 140 connected to the pressure regulating valve 34. The same shape of the flow path may be applied to other flow paths. For example, the shape of the end plate unit flow path in the oxidization gas supply manifold connected to the sealing valve 36 (see FIG. 1) may be the shape in the above-described embodiments. Alternatively, there may be provided, in the end plate 120, a valve for sealing the anode-side flow path when the power generation of the fuel cell 100 is stopped, to be adjacent to the opening of the fuel gas supply manifold or the opening of the fuel gas discharge manifold. Then, the shape of the end plate unit flow path connected to the valve may be the shape in the above-described embodiments.

The present disclosure is not limited to the above-described embodiments, and may be achieved by various configurations without departing from the scope of the disclosure. For example, the technical features in the embodiments may be appropriately replaced or combined in order to solve a part or all of the above-described problems or achieve a part or all of the above-described effects. Moreover, unless the technical features are explained as necessary in the specification, they may be deleted appropriately. For example, the present disclosure may be implemented as the following aspects.

(1) One aspect of the disclosure provides a fuel cell. The fuel cell includes a fuel cell stack including a stacked body with a plurality of stacked unit cells, an end plate unit with an end plate arranged at an end of the stacked body, and a gas manifold penetrating the stacked body and the end plate unit in a stacking direction, the gas manifold being configured such that reaction gas flows through therein; and a valve disposed between the end plate unit and a gas piping configured to supply or discharge the reaction gas to or from the fuel cell, and the valve including an in-valve flow path communicating the gas manifold and the gas piping, and a valve element. The gas manifold includes a stacked body manifold penetrating the stacked body in the stacking direction and an end plate unit flow path penetrating the end plate unit, and when the fuel cell stack is arranged so that a manifold bottom portion that is a bottom portion extending in the stacking direction in the stacked body manifold is horizontal, a bottom portion of an opening on the valve side in the end plate unit flow path is arranged above the manifold bottom portion.

In the fuel cell of this aspect, even in a case where liquid water occurs in the gas manifold after the fuel cell stops power generation, it is possible to prevent the occurred liquid water from outflowing the bottom portion of the opening on the valve side in the end plate unit flow path into the valve. As a result, it is possible to prevent freezing of liquid water in the valve after the fuel cell stops power generation.

(2) In the fuel cell of the above-described aspect, when the fuel cell stack is arranged so that the manifold bottom portion is horizontal, a first lower portion arranged below the manifold bottom portion may exist in the end plate unit flow path. In the fuel cell of this aspect, it is possible to improve the function of retaining liquid water before the valve in the gas manifold and improve the effect of preventing a flow of liquid water into the valve.

(3) In the fuel cell of the above-described aspect, the end plate unit may include, in addition to the end plate, an adaptor connecting between the end plate and the valve and including a part of the end plate unit flow path, and the first lower portion may include a bottom portion of the end plate unit flow path at a boundary between the end plate and the adaptor. In the fuel cell of this aspect, it is possible to more easily form a flow path with the first lower portion in the end plate unit flow path.

(4) In the fuel cell of the above-described aspect, the end plate unit may include, on an inner wall surface of a through-hole provided in the end plate and configured to form the end plate unit flow path, a resin layer forming an inner wall surface of the end plate unit flow path, and an inner diameter of the resin layer may gradually increase from an end on the stacked body side toward an end on the adaptor side. In the fuel cell of this aspect, a shaping mold reducing in diameter toward the end is inserted to the through-hole from the end on the side with a larger inner diameter of the resin layer, which makes it possible to easily form the resin layer.

(5) In the fuel cell of the above-described aspect, when the fuel cell stack is arranged so that the manifold bottom portion is horizontal, the manifold bottom portion may be in a lowest position in the gas manifold. In the fuel cell of this aspect, it is possible to retain liquid water before the valve in the gas manifold and prevent a flow of liquid water into the valve.

(6) In the fuel cell of the above-described aspect, the end plate unit may include, on an inner wall surface of a through-hole provided in the end plate and configured to form the end plate unit flow path, a resin layer forming an inner wall surface of the end plate unit flow path, and an inner diameter of the resin layer may gradually reduce from an end on the stacked body side toward an end on the valve side. In the fuel cell of this aspect, a shaping mold reducing in diameter toward the end is inserted to the through-hole from the end on the side with a larger inner diameter of the resin layer, which makes it possible to easily form the resin layer.

(7) Another aspect of the disclosure provides a fuel cell mounted device with a fuel cell. The fuel cell mounted device includes the fuel cell according to any one of (1) to (6); a support member that supports the fuel cell; and a fixing member that fixes the fuel cell to the support member. The gas manifold is a gas discharge manifold configured such that the reaction gas discharged from the plurality of unit cells flows through therein, the fixing member fixes the fuel cell stack to the support member so that the stacked body manifold is tilted downward in a flow direction of the reaction gas, and a bottom portion of an opening on the valve side in the end plate unit flow path is arranged above an end on the end plate unit side in the manifold bottom portion.

In the fuel cell mounted device of this aspect, even in a case where the fuel cell stack is arranged so that the stacked body manifold is tilted downward in the flow direction of reaction gas, it is possible to improve the effect of preventing liquid water occurred in the gas manifold from flowing into the valve.

(8) Still another aspect of the disclosure provides a fuel cell mounted device with a fuel cell. The fuel cell mounted device includes the fuel cell according to any one of (1) to (6); a support member that supports the fuel cell; and a fixing member that fixes the fuel cell to the support member. The gas manifold is a gas discharge manifold configured such that the reaction gas discharged from the plurality of unit cells flows through therein, the fixing member fixes the fuel cell stack to the support member so that the stacked body manifold is tilted downward in a flow direction of the reaction gas, and the end plate unit flow path includes a second lower portion that is positioned below an end on the end plate unit side in the manifold bottom portion and a bottom portion of an opening on the valve side in the end plate unit flow path.

In the fuel cell mounted device of this aspect, even in a case where the fuel cell stack is arranged so that the stacked body manifold is tilted downward in the flow direction of reaction gas, it is possible to improve the function of retaining liquid water before the valve in the gas manifold and improve the effect of preventing a flow of liquid water into the valve.

The disclosure may be achieved by various aspects other than the above-described aspects, and may be achieved by a method of manufacturing a fuel cell, a fuel cell system, a fuel cell vehicle, a method of preventing freezing of a valve for a fuel cell, and the like, for example.

What is claimed is:

1. A fuel cell, comprising:
a fuel cell stack including a stacked body with a plurality of stacked unit cells, an end plate unit with an end plate arranged at an end of the stacked body, and a gas manifold penetrating the stacked body and the end plate unit in a stacking direction, the gas manifold being configured such that reaction gas flows through therein; and
a valve disposed between the end plate unit and a gas piping configured to supply or discharge the reaction gas to or from the fuel cell, and the valve including an in-valve flow path communicating the gas manifold and the gas piping, and a valve element, wherein
the gas manifold includes a stacked body manifold penetrating the stacked body in the stacking direction and an end plate unit flow path penetrating the end plate unit, and
when the fuel cell stack is arranged so that a manifold bottom portion that is a bottom portion extending in the stacking direction in the stacked body manifold is horizontal, a bottom portion of an opening on the valve side in the end plate unit flow path is arranged above the manifold bottom portion;
wherein the end plate further comprises an adaptor connected to an end side opposite to a side on which the stacked body of the end plate is positioned, and the bottom portion of an opening on the valve side in the end plate unit flow path is formed in the adaptor.

2. The fuel cell according to claim 1, wherein
when the fuel cell stack is arranged so that the manifold bottom portion is horizontal, a first lower portion arranged below the manifold bottom portion exists in the end plate unit flow path.

3. The fuel cell according to claim 2, wherein
the end plate unit includes, in addition to the end plate, an adaptor connecting between the end plate and the valve and including a part of the end plate unit flow path, and
the first lower portion includes a bottom portion of the end plate unit flow path at a boundary between the end plate and the adaptor.

4. The fuel cell according to claim 3, wherein
the end plate unit includes, on an inner wall surface of a through-hole provided in the end plate, a resin layer forming an inner wall surface of the end plate unit flow path, and an inner diameter of the resin layer gradually increases from an end on the stacked body side toward an end on the adaptor side.

5. The fuel cell according to claim 1, wherein
when the fuel cell stack is arranged so that the manifold bottom portion is horizontal, the manifold bottom portion is in a lowest position in the gas manifold.

6. The fuel cell according to claim 5, wherein
the end plate unit includes, on an inner wall surface of a through-hole provided in the end plate, a resin layer forming an inner wall surface of the end plate unit flow path, and
an inner diameter of the resin layer gradually reduces from an end on the stacked body side toward an end on the valve side.

7. A fuel cell mounted device with a fuel cell, comprising:
a fuel cell, the fuel cell comprising:
  a fuel cell stack including a stacked body with a plurality of stacked unit cells, an end plate unit with an end plate arranged at an end of the stacked body, and a gas manifold penetrating the stacked body and the end plate unit in a stacking direction, the gas manifold being configured such that reaction gas flows through therein; and
  a valve disposed between the end plate unit and a gas piping configured to supply or discharge the reaction gas to or from the fuel cell, and the valve including an in-valve flow path communicating the gas manifold and the gas piping, and a valve element, wherein
  the gas manifold includes a stacked body manifold penetrating the stacked body in the stacking direction and an end plate unit flow path penetrating the end plate unit, and
  when the fuel cell stack is arranged so that a manifold bottom portion that is a bottom portion extending in the stacking direction in the stacked body manifold is horizontal, a bottom portion of an opening on the valve side in the end plate unit flow path is arranged above the manifold bottom portion;
a support member that supports the fuel cell; and
a fixing member that fixes the fuel cell to the support member, wherein
the gas manifold is a gas discharge manifold configured such that the reaction gas discharged from the plurality of unit cells flows through therein,
the fixing member fixes the fuel cell stack to the support member so that the stacked body manifold is tilted downward in a flow direction of the reaction gas, and
a bottom portion of an opening on the valve side in the end plate unit flow path is arranged above an end on the end plate unit side in the manifold bottom portion.

8. A fuel cell mounted device with a fuel cell, comprising:
a fuel cell, the fuel cell comprising:
  a fuel cell stack including a stacked body with a plurality of stacked unit cells, an end plate unit with an end plate arranged at an end of the stacked body, and a gas manifold penetrating the stacked body and the end plate unit in a stacking direction, the gas manifold being configured such that reaction gas flows through therein; and
  a valve disposed between the end plate unit and a gas piping configured to supply or discharge the reaction gas to or from the fuel cell, and the valve including an in-valve flow path communicating the gas manifold and the gas piping, and a valve element, wherein
  the gas manifold includes a stacked body manifold penetrating the stacked body in the stacking direction and an end plate unit flow path penetrating the end plate unit, and
  when the fuel cell stack is arranged so that a manifold bottom portion that is a bottom portion extending in the stacking direction in the stacked body manifold is horizontal, a bottom portion of an opening on the valve side in the end plate unit flow path is arranged above the manifold bottom portion;
a support member that supports the fuel cell; and
a fixing member that fixes the fuel cell to the support member, wherein
the gas manifold is a gas discharge manifold configured such that the reaction gas discharged from the plurality of unit cells flows through therein,
the fixing member fixes the fuel cell stack to the support member so that the stacked body manifold is tilted downward in a flow direction of the reaction gas, and
the end plate unit flow path includes a second lower portion that is positioned below an end on the end plate unit side in the manifold bottom portion and a bottom portion of an opening on the valve side in the end plate unit flow path.

9. A method of manufacturing a fuel cell, the fuel cell comprising:
a fuel cell stack including a stacked body with a plurality of stacked unit cells, an end plate unit with an end plate arranged at an end of the stacked body, and a gas manifold penetrating the stacked body and the end plate unit in a stacking direction, the gas manifold being configured such that reaction gas flows through therein; and
a valve disposed between the end plate unit and a gas piping configured to supply or discharge the reaction gas to or from the fuel cell, and the valve including an in-valve flow path communicating the gas manifold and the gas piping, and a valve element, wherein
the gas manifold includes a stacked body manifold penetrating the stacked body in the stacking direction and an end plate unit flow path penetrating the end plate unit, and
when the fuel cell stack is arranged so that a manifold bottom portion that is a bottom portion extending in the stacking direction in the stacked body manifold is horizontal, a bottom portion of an opening on the valve side in the end plate unit flow path is arranged above the manifold bottom portion;
wherein when the fuel cell stack is arranged so that the manifold bottom portion is horizontal, a first lower portion arranged below the manifold bottom portion exists in the end plate unit flow path;
wherein the end plate unit includes, in addition to the end plate, an adaptor connecting between the end plate and the valve and including a part of the end plate unit flow path, and the first lower portion includes a bottom portion of the end plate unit flow path at a boundary between the end plate and the adaptor;
wherein the end plate unit includes, on an inner wall surface of a through-hole provided in the end plate, a resin layer forming an inner wall surface of the end plate unit flow path, and an inner diameter of the resin layer gradually increases from an end on the stacked body side toward an end on the adaptor side;

the method comprising the steps of:
- inserting a shaping mold gradually reducing in diameter toward an end into the through-hole of the end plate from an opening on the adaptor side,
- integrally forming the resin layer on the end plate by insert molding.

10. A method of manufacturing the fuel cell of 6, comprising:
- inserting a shaping mold gradually reducing in diameter toward an end into the through-hole of the end plate from an opening on the stacked body side,
- integrally forming the resin layer on the end plate by insert molding.

* * * * *